United States Patent [19]

Peterson

[11] Patent Number: 5,626,516

[45] Date of Patent: May 6, 1997

[54] PRESSURE ACTUATED DOOR

[75] Inventor: Francis C. Peterson, Prescott, Wis.

[73] Assignee: Phillips Plastics Corporation, Prescott, Wis.

[21] Appl. No.: 403,902

[22] PCT Filed: Sep. 17, 1993

[86] PCT No.: PCT/US93/08806

§ 371 Date: May 15, 1995

§ 102(e) Date: May 15, 1995

[87] PCT Pub. No.: WO94/06644

PCT Pub. Date: Mar. 31, 1994

[51] Int. Cl.⁶ .................................................. B60H 1/24
[52] U.S. Cl. .................... 454/69; 137/907; 251/60; 251/61.1; 454/139
[58] Field of Search ...................... 137/875, 907; 251/60, 61.1, 285, 298; 454/69, 139

[56] References Cited

U.S. PATENT DOCUMENTS

| 4,555,945 | 12/1985 | Hanson | 73/517 |
| 4,614,152 | 9/1986 | Fufasaku | 454/139 |
| 4,765,675 | 8/1988 | Svensson | 296/97 |
| 4,903,854 | 2/1990 | Schiemann | 220/94 |
| 5,016,856 | 5/1991 | Tartaglino | 137/907 X |
| 5,277,397 | 1/1994 | Tartaglino | 137/907 X |

FOREIGN PATENT DOCUMENTS

| 2381449 | 9/1978 | France . | |
| 61-99711A | 6/1985 | Japan . | |
| 60-99711 | 6/1985 | Japan | 454/139 |
| 2010470 | 6/1979 | United Kingdom . | |
| 2123947 | 2/1984 | United Kingdom . | |

OTHER PUBLICATIONS

Patent Abstracts of Japan, 62–55218, Japan, Mar. 1987.
Patent Abstracts of Japan, 61–75012, Japan, Apr. 1986.
Automatic Flexdampers, Enerzone Automotive, Dallas, Texas, pp. 1–13.

Primary Examiner—Harold Joyce
Attorney, Agent, or Firm—Merchant, Gould, Smith, Edell, Welter & Schmidt

[57] ABSTRACT

The invention is a flow control for a ventilation duct. It includes a movable panel which is attached to a variable volume reservoir. The application of vacuum to the reservoir controls the angular position of the door and the volume of the reservoir.

1 Claim, 5 Drawing Sheets

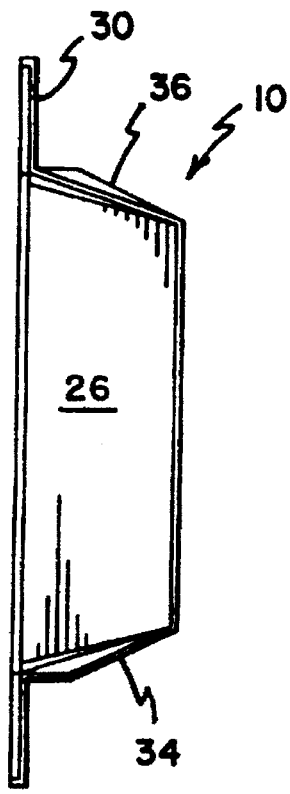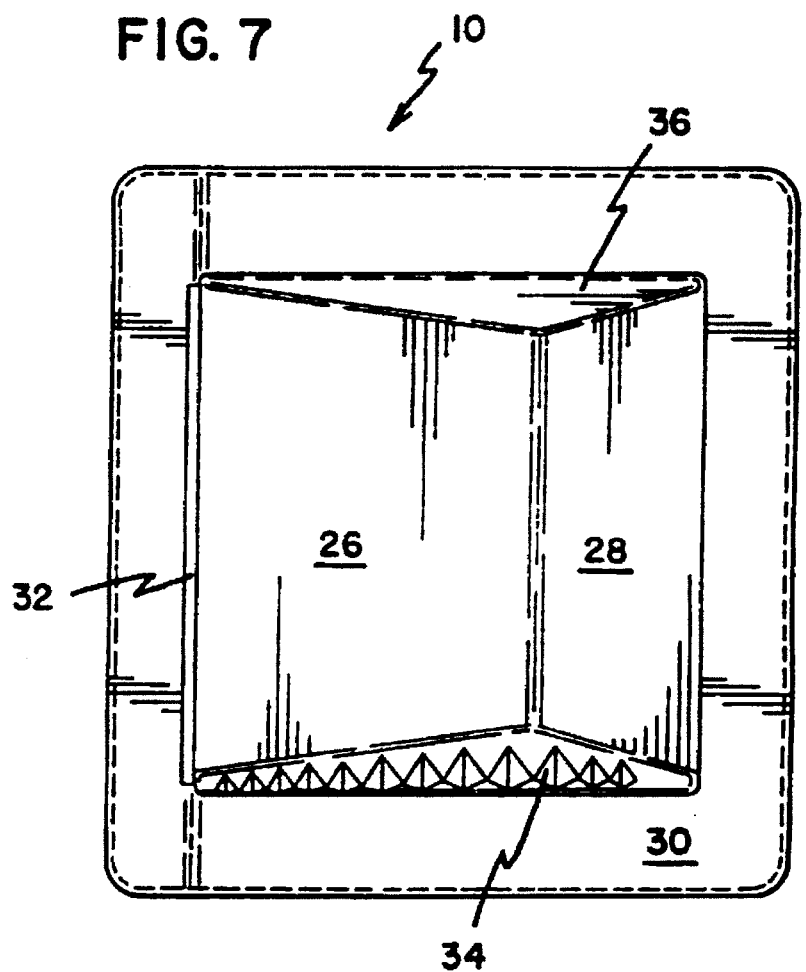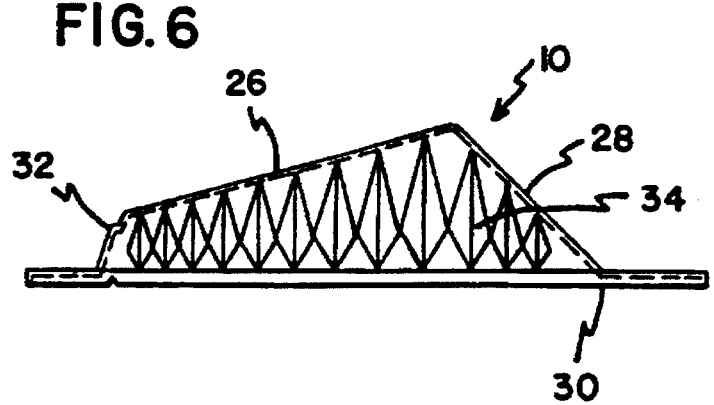

5,626,516

PRESSURE ACTUATED DOOR

TECHNICAL FIELD

The invention relates to air flow control structures used for heating and cooling systems, and more particularly to a pressure operated door for use in controlling ventilation air flow in an automobile.

BACKGROUND ART

Modern automobiles have complex ventilation systems which include air-cooling and air-heating units. Typically, rigid doors are provided within the duct work to control and direct the passage of air. Usually, the doors are mounted on a door axle which is rotated by a vacuum actuator located on the exterior surface of the duct work. More recently, it has been proposed to integrate a bellows type actuator with the door structure. However, such devices are bulky and prone to failure.

SUMMARY DISCLOSURE

According to the invention, several rigid panels 26,28,30, 32 are linked together with hinges to form a polygonal linkage. The panels along with a first side wall 34 and a second side wall 36 define a closed reservoir 22. The volume within this reservoir 22 is variable and depends upon the various angles between the various panels which make up the reservoir 22. A vacuum drawn in the reservoir 22 causes ambient air pressure to collapse the reservoir by reducing the interior volume of the reservoir 22 due to the movement of the linked panels.

Reduction of the volume of the reservoir is accompanied by movement of the panels. One of the panels such as panel 30 may form a portion of a door assembly 10. Consequently the application of vacuum to the reservoir 22 causes the door assembly 10 to move from a first position to a second position.

The panels and hinges are illustratively arranged to produce an asymmetrical trapezoidal shape for the polygonal linkage. This asymmetry causes the linkage to move in a preferred direction as the reservoir volume is reduced. The integration of the linkage into the door structure provides a compact space efficient assembly which has a long service life and which may be readily designed into an automotive ventilation system.

BRIEF DESCRIPTION OF THE DRAWINGS

An illustrative and exemplary embodiment of the invention is shown in the various figures. Identical reference numerals refer to identical structure throughout.

FIG. 5 is a front view of the door assembly in isolation.

FIG. 6 is a side view of the door assembly in isolation.

FIG. 7 is a front view of the door assembly in isolation.

DETAILED DESCRIPTION OF THE INVENTION

Figure 1:
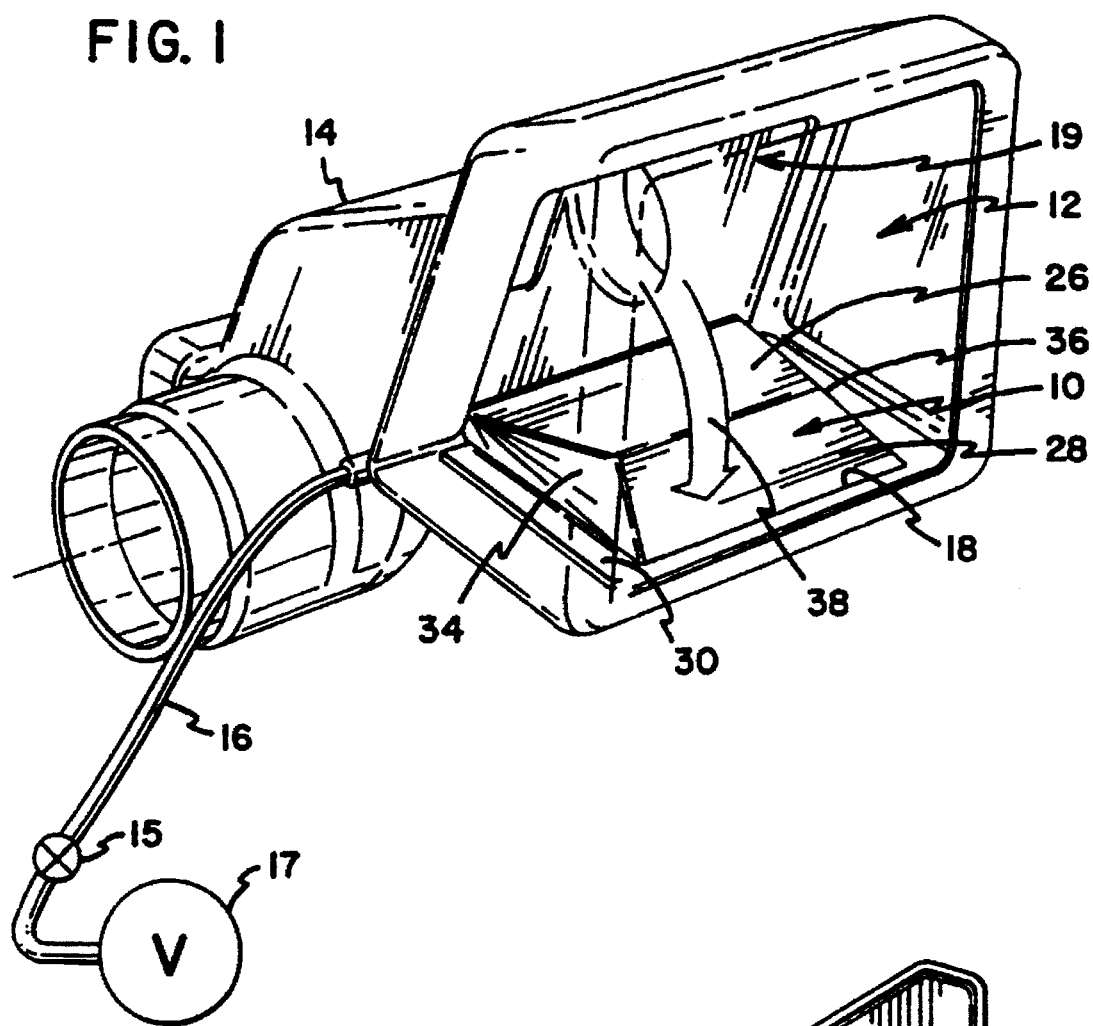
FIG. 1 is a perspective view of the door assembly.

FIG. 1 shows the door assembly 10 located in a plenum 12 of an automotive ventilation duct 14. The ventilation duct 14 includes an opening 18 and an opening 19. In FIG. 1 the door assembly 10 is in the actuated state which defines a "first position" for the door panel 30. In this position subatmospheric pressure is present in the interior volume 20 of the reservoir 22 which makes up a portion of the door assembly 10. Air pressure in the reservoir portion of the door assembly is controlled by a remote vacuum source 17 which is connected to the door assembly through a valve 15 and a vacuum line 16.

The door assembly 10 includes several panels. In the embodiment shown in FIG. 1, the door assembly includes panel 26, panel 28, door panel 30, and stationary base panel 32. Panel 26 is Joined to base panel 32 with a hinge 27. Panel 26 is joined to panel 28 by hinge 29. Panel 28 is joined to the door panel 30 by hinge 31. The door panel 30 is attached to base panel 32 through hinge 33. Together these four panels and associated hinges form a polygon linkage 37 seen best in FIG. 2 or FIG. 4. Pleated bellows structures may be used for side wall 34 and side wall 36. The side walls are required to close off the polygon linkage to form the interior volume 20 of the reservoir 22, defined by the panels and side walls.

Figure 2:
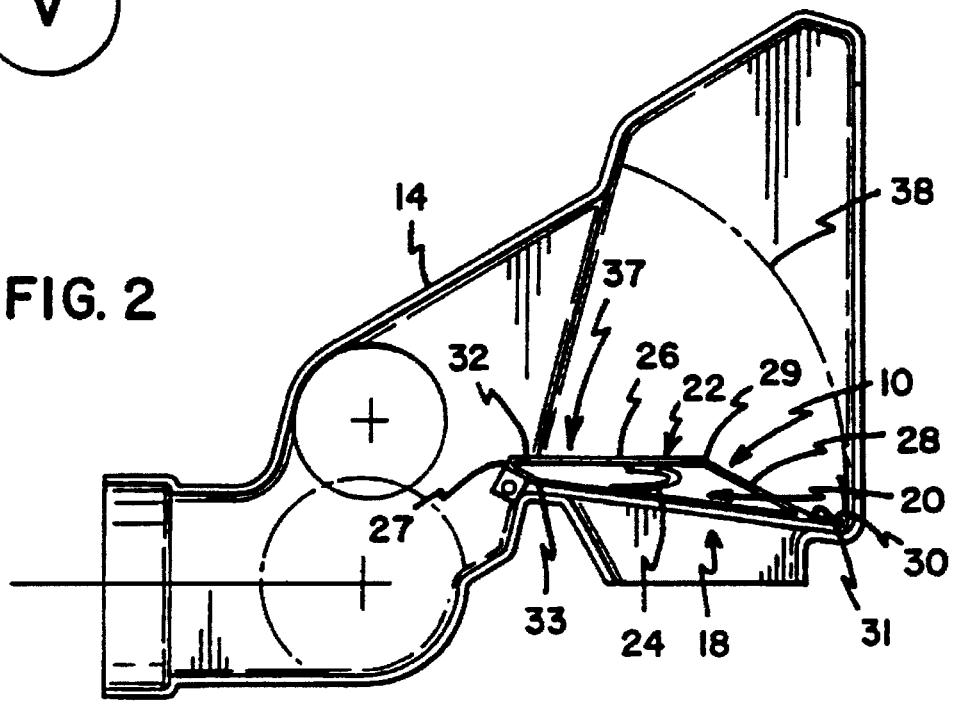
FIG. 2 is a cross-section of the door assembly.

FIG. 2 shows the door assembly 10 in the actuated position where the door panel 30 blocks off an opening 18 in the ventilation duct 14. In this cross-section view the interior volume 20 of the reservoir 22 is seen in the minimum volume configuration. The subatmospheric pressure within the reservoir 22 causes the return spring 24 to be compressed between panel 26 and door panel 30, as the door assembly 10 rotates in the clockwise sense as indicated by arrow 38. This is the maximum energy state for the door assembly 10. In this view it should be appreciated that the base panel is attached to an interior surface of the ventilation duct 14. Consequently only this panel remains stationary with respect to the ventilation duct 14 as the volume of the reservoir 22 changes.

Figure 3:
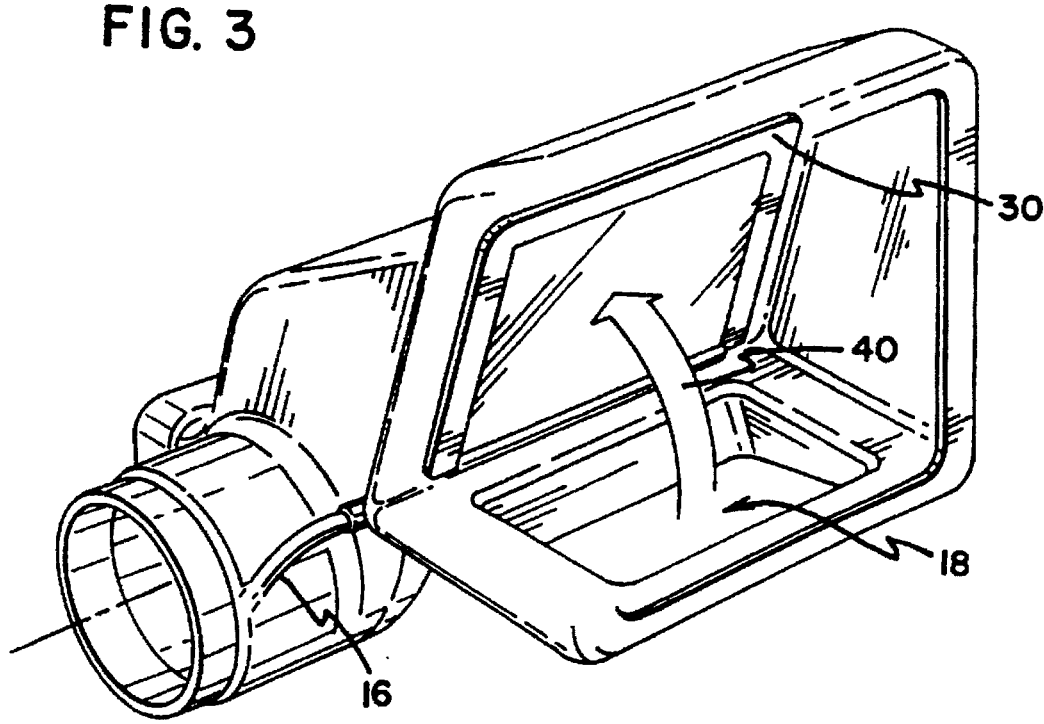
FIG. 3 is a perspective view of the door assembly.

FIG. 3 shows the door assembly rotated into the relaxed state which defines a "second position" for the door panel 30. Motion in the counterclockwise direction is indicated by arrow 40. This motion occurs when near atmospheric pressure is admitted to the reservoir 22 through the vacuum line 16.

Figure 4:
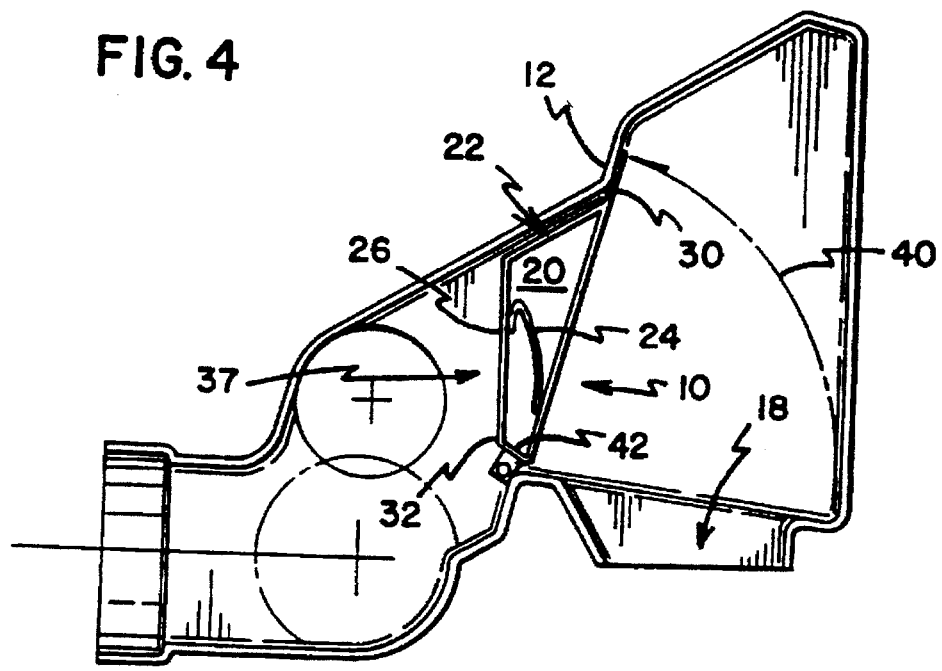
FIG. 4 is a cross-section of the door assembly.

FIG. 4 shows the door assembly 10 in the second position. In this instance the return spring 24 supplies force between door panel 30 and panel 26. In this minimum energy state the size of the interior volume 20 of the reservoir 22 is at its maximum. In this second position the door panel 30 in abutment with the plenum 12 closing off an opening 19. In this position the door panel 30 blocks off opening 19 and opens opening 18. One should note that this plenum wall limits continued motion in the counterclockwise direction. This figure also shows the base panel 32 most clearly and also shows the aperture 42 which connects the vacuum line 16 with the interior volume 20 of the reservoir 22.

Comparison of the area confined between the panels in FIG. 2 to the area shown in FIG. 4 reveals that the size of the interior volume 20 tends to increase as the door assembly 10 rotates in the counterclockwise direction in the sense of the figure. Assuming that the door assembly 10 is in the minimum energy state and the panel dimensions and angles have been selected so that the reduction in reservoir volume from displacement in the clockwise direction exceeds reduction in reservoir volume from displacement in the counterclockwise direction then the panel will prefer to rotate in the direction resulting in the greatest reduction of volume. By selecting asymmetrical panel dimensions to achieve this volume change effect the door assembly 10 can be biased to prefer rotation in the clockwise direction upon the application of subatmospheric pressure via vacuum line 16.

FIG. 5, FIG. 6 and FIG. 7 should be considered together. These drawings depict the door assembly 10 in isolation and show a form of construction which uses a number of "living hinges" on a unitary molded part to form the panels and side walls.

Figure 8:
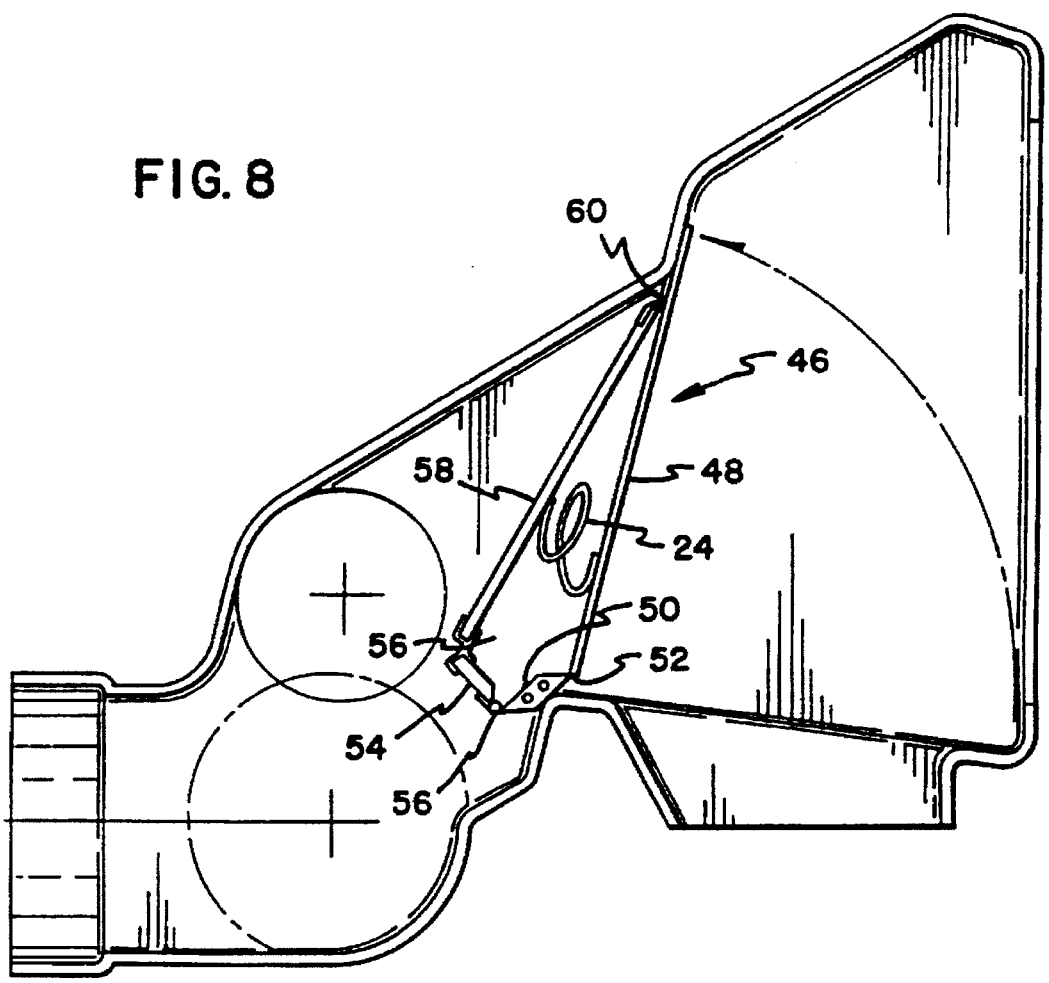
FIG. 8 is a side view of an alternate door construction.

FIG. 8 depicts an alternate and preferred form of door assembly 46 construction. In this embodiment the first door panel 48 is connected to a second mounting panel 50 by an elastomeric hinge 52. The third base panel 54 is likewise hinged to the second mounting panel 50 with an elastomeric hinge 56. The fourth actuator panel 58 is hinged via elastomeric hinge 60 to first door panel 48. It is desirable to supply a coil type restoring spring 74.

The relatively rigid panels along with the elastomeric hinges provides a structure which is capable of moving the first door panel 48 through approximately ninety degrees of rotation.

Figure 9:
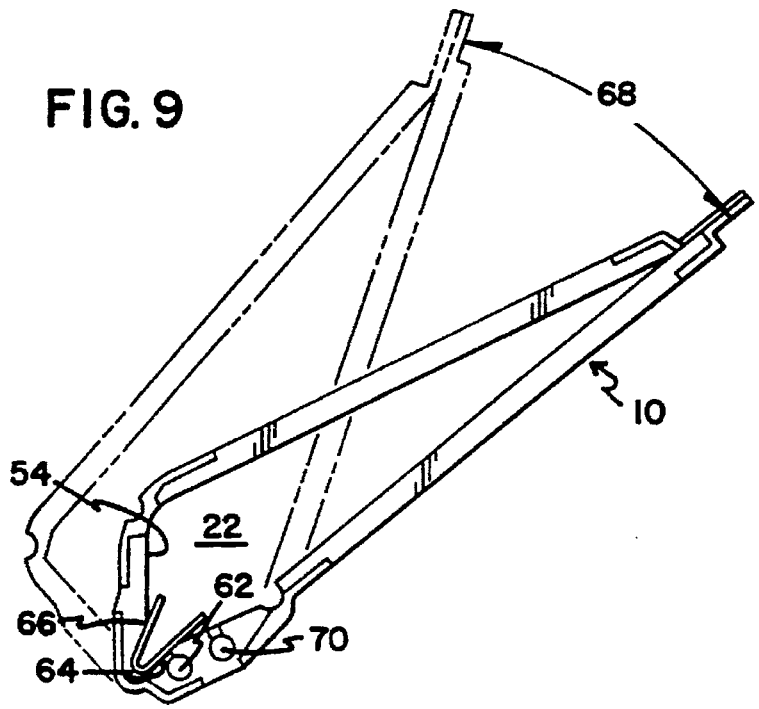
FIG. 9 is a detail side view of an alternate door assembly.

FIG. 9 is a detail side view of an alternate door assembly which can be positioned in an "intermediate" position between the first position and the second position. In this embodiment two air passages are provided. The first passage 62 is connected to a first orifice 64 which communicates with the reservoir 22. A small leaf type valve spring 66 is attached to the base panel 54 and moves into abutment with the first orifice 64 as the door assembly moves through arc 68. When a vacuum is drawn at first air passage 62 the door assembly 10 will rotate through the arc 68 until the first orifice 64 is covered by the leaf type valve spring 66. Any leakage will cause the orifice to become uncovered thus repositioning the door in the intermediate position. If full motion is desired, vacuum can be applied to the second air passage 70. The second orifice 72 which communicates to the reservoir 22 from second air passage 70 is not obstructed by the valve spring 66 and therefore permits the full range of door motion into the second position. The light restoring force supplied by the valve spring 66 does not prevent this motion.

In some applications it may be preferably to operate the door assembly with positive pressure. In these applications the spring 66 would be arranged to bias the reservoir into the minimum volume state. The application of super atmospheric pressure would then move the door toward the maximum volume state.

Figure 10:
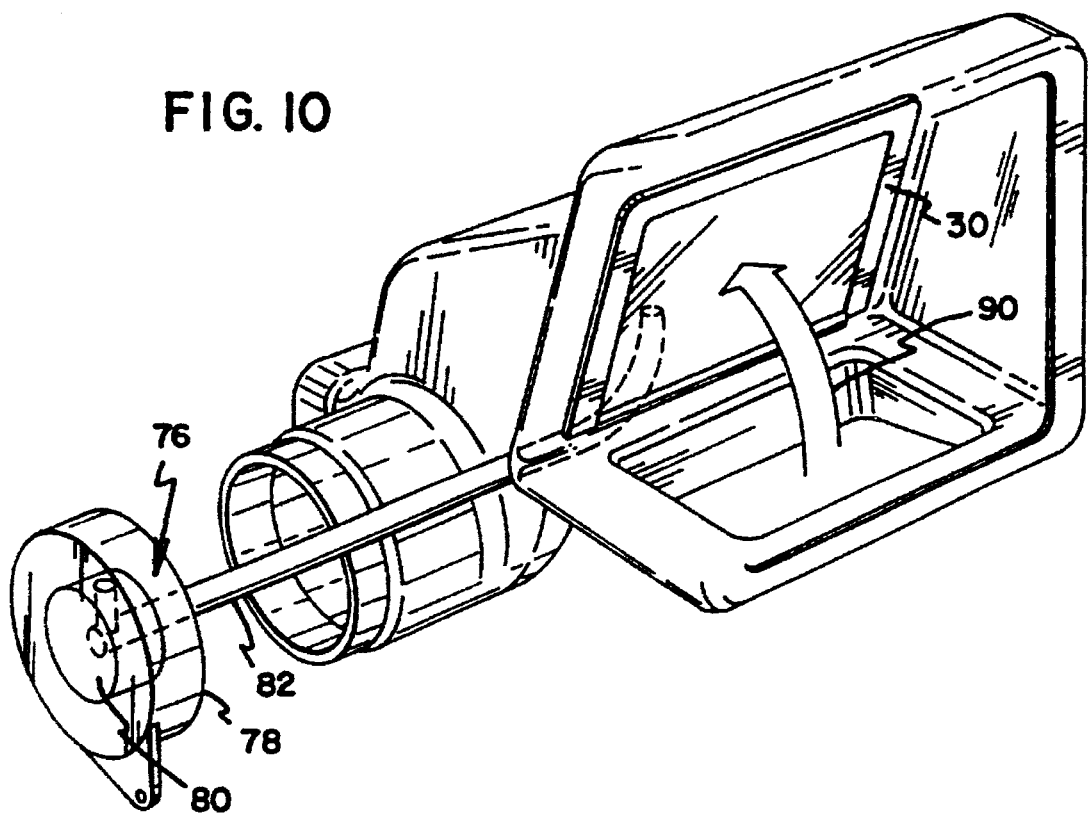
FIG. 10 is a perspective view of a valve mechanism for positioning the door assembly.
Figure 11:
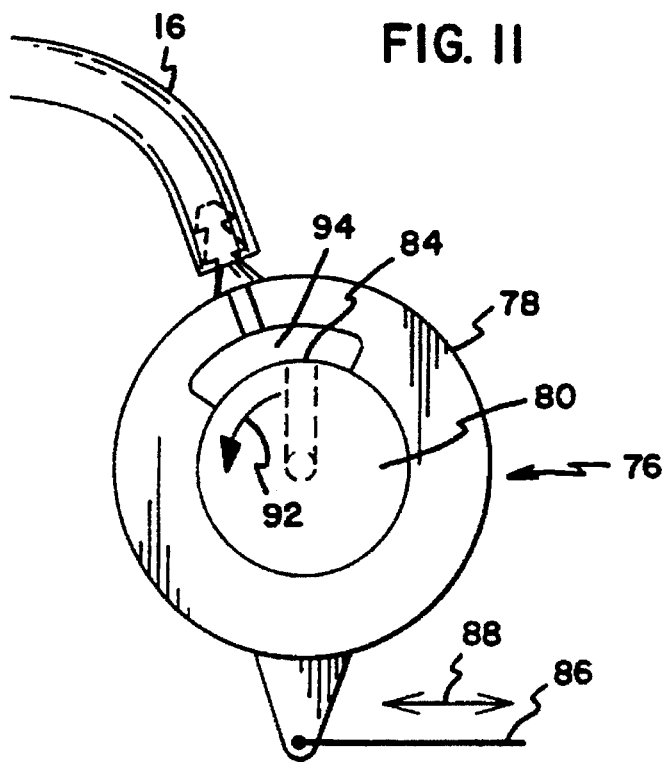
FIG. 11 is a side view of a valve mechanism for positioning the door assembly.

FIG. 10 and FIG. 11 show a rotary valve assembly 76 which may be used in some automotive applications where it is desirable to stop the door panel at intermediate positions. The rotary valve assembly includes an annular control ring which is concentrically mounted on the periphery of a rotary piston 80. The rotary piston is connected to a tube 82 which is mounted for rotation with the door panel 30. The tube includes an interior passage which permits fluid communication between the interior volume 20 of the reservoir 22 with the port 84 formed on the periphery of the rotary piston 80. In operation the user selects the desired position for the door by rotating the control ring 78 to a corresponding annular location. Conventionally such automotive controls use a movable wire 86 which can be moved by a user actuated control lever. Motion of the movable wire 86 along path 88 rotates the control ring to a user selected position. Vacuum is supplied to the reservoir through the port 84. In general, the return spring 24 will supply force which will move the door 30 along path 90 causing the port 84 to rotate in the counterclockwise direction indicated by path 92. However the vacuum supplied via the tube 82 from the vacuum line 16 causes the door 30 to move in the clockwise direction. The resultant action is that the door remains in the position defined by the annular location of the slot 94.

What is claimed is:

1. A door assembly for controlling air flow through a ventilation duct, said door assembly of the type having a reservoir and a movable panel; wherein the improvement comprises:

a tube connected to said movable panel and communicating with said reservoir;

a rotary piston coupled to said tube and having a port which communicates with said reservoir; and an annular control ring mounted concentric with said rotary piston and having a slot in communication with a source of pressurized fluid, whereby the position of said slot with respect to said port determines the position of said door panel.

* * * * *